(12) United States Patent
Dhong et al.

(10) Patent No.: US 7,290,023 B2
(45) Date of Patent: Oct. 30, 2007

(54) HIGH PERFORMANCE IMPLEMENTATION OF EXPONENT ADJUSTMENT IN A FLOATING POINT DESIGN

(75) Inventors: Sang Hoo Dhong, Austin, TX (US); Silvia Melitta Mueller, Saarland (DE); Hwa-Joon Oh, Austin, TX (US); Kevin D. Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 10/718,303

(22) Filed: Nov. 20, 2003

(65) Prior Publication Data

US 2005/0114422 A1    May 26, 2005

(51) Int. Cl.
    *G06F 7/38*    (2006.01)
(52) U.S. Cl. ..................................... 708/501
(58) Field of Classification Search ............... 708/495, 708/501, 505
    See application file for complete search history.

(56) References Cited

U.S. PATENT DOCUMENTS 5,539,684 A * 7/1996 Quintana et al. ........... 708/500
5,889,690 A * 3/1999 Arakawa .................... 708/501
5,993,051 A * 11/1999 Jiang et al. ................. 708/501
6,631,392 B1 * 10/2003 Jiang et al. ................. 708/498
6,779,008 B1 * 8/2004 Erle et al. ................... 708/211

OTHER PUBLICATIONS

IEEE Computer Society, Standards Committee of the, "IEEE Standard for Binary Floating-Point Arithmetic," ANSI/IEEE Std 754-1985, Institute of Electrical and Electronics Engineers, Inc., 1985, New York, NY, U.S.A.

* cited by examiner

*Primary Examiner*—Chuong D. Ngo
(74) *Attorney, Agent, or Firm*—Carr LLP; D'Ann N. Rifai

(57) ABSTRACT

A floating point unit (FPU) which generates a correction signal and an inverted leading zero signal. Exponent logic, is configured to generate an exponent value, a first incremented exponent value, and a second incremented exponent value. Exponent adjust and rounding logic configured to receive the exponent value, the first incremented exponent value, and the second incremented exponent value. The exponent adjust and rounding logic is further configured to add the inverted leading zero signal to the first incremented exponent value and the second incremented exponent value, thereby producing an exponent output value, a first incremented exponent output value, and a second incremented exponent output value. Either the exponent output value, the first incremented exponent output value, or the second exponent output value are then selected.

13 Claims, 2 Drawing Sheets

HIGH PERFORMANCE IMPLEMENTATION OF EXPONENT ADJUSTMENT IN A FLOATING POINT DESIGN

TECHNICAL FIELD

The invention relates generally to floating point units (FPUs) and, more particularly, to a floating point unit that calculates exponent values within exponent logic.

BACKGROUND

The calculation of a floating point within processing systems is an important part of numerical calculation. Floating point calculation can be generally defined as the computation of a number that potentially has meaningful values to the right of a decimal point. There are a number of ways to represent and calculate floating point computations.

In the Institute for Electronics and Electrical Engineers (IEEE) 754 Binary Floating Point Standard, a floating point number is represented as sign, exponent and fraction. The exponent is represented as a biased binary value. In other words, the exponent "e" is the binary value of "E" minus a pre-defined bias. This can be represented mathematically as the value(E)=binary_value(E)−bias. For n-bit exponents, the bias value is $(2^{(n-1)}-1)$. For instance, for an 8-bit exponent of a single precision number, the bias is 127.

FPU design is split into an exponent data path and a fraction data path. The input into a fraction adder of the fraction data path is in the form of A times B plus C. The exponent data path conveys the exponents Ea, Eb and Ec into an exponent logic.

In conventional FPUs, there is generated an exponent value from exponent logic. Depending on the exponent difference of addend and product, and some sign information as calculated within the fraction adder and conveyed over a select product line, this exponent either is the exponent of the addend (Ec), the exponent of the product (Ea+Eb−bias), or the exponent of the product plus an offset (Ea+Eb+delta).

Thus, based on the exponent difference, multiplexers select three values Ex, Ey, Ez, which, when added together, give the appropriate exponent. These three values are input into a 3:2 compressor, thereby generating a carry and a sum. The carry and the sum are then added together in a 2:1 adder. This summed value is then conveyed to an Exponent Adjust and Rounding logic (EAD). This summed value is the value "e." The summed value is the exponent corresponding to the unrounded fraction provided by the adder in the fraction data path. The EAD logic adjusts the exponent based on the normalization shift amount and performs the exponent rounding.

Within the FPU calculator, there is also something called a "leading zero anticipator" (LZA). The LZA generates an estimate of the number of leading zeroes in the result of the fraction adder. In other words, while the exponent logic determines the addition of received exponent values Ea, Eb and Ec, the LZA predicts the number of zeros that are going to occur as "leading zeros" within the addition process of the fraction adder. However, this is only a prediction, and the prediction of the LZA can be one more than it should be. Whatever the result, the output of the LZA is subtracted from the output of the 2:1 adder of the exponent logic (the value "e") and a first possible value, "e2", is generated.

As discussed previously, due to the nature of the LZA estimation, the exponent "e2" using the estimate from the LZA can be one count lower than the exponent should be if the count of the LZA were to accurately reflect the number of leading zeros. Therefore, the EAD calculates the exponent based on both the possible values of the actual number of leading zeros. For instance, e2=e−lza and e2=e−lza+1. Meanwhile, both the output of the LZA and the fraction adder are input into an LZA correction circuit. The LZA correction circuit then sends a signal, lza_corr, to the EAD that signifies whether or not to use the higher or lower exponent number in the EAD. The EAD uses the lza_corr to select one of the two possible e2 values. In other words, the selected value becomes the final e2 value.

Meanwhile, and substantially in parallel, a normalizer-rounder circuit receives as input the output of the fraction adder and the output of the LZA. The normalizer takes a received calculated value of an arbitrary number of floating point precision, such as 128 bits, and "normalizes" it, shifting out the leading zeros. The rounder rounds the normalized fraction to a standard format of "x" number of bits, such as 23 bits for single precision. The rounding of the exponent is done in EAD.

Furthermore, within the EAD, after the selection of the correct e2 value (which occurs after receiving the lza_corr value from the lza_correction signal from the LZA correction circuit), the FPU tests for overflow, underflow or special values, such as NAN and Infinity (this is part of the exponent rounding). Typically, e2 is compared to both an "emax" value and an "emin" value (these values are constants), and overflow and underflow signaling values are generated therefrom. These overflow and underflow signaling values are incorporated into a result select signal generated by the EAD. The result select signal signifies whether e2 (and the normalized rounded fraction) is a valid value or, alternatively, whether an underflow or overflow has occurred or whether a special result (NAN, infinity, zero) is to be chosen. The result select signal and the e2 value are input into the result MUX. The result MUX selects between the regular rounded result, and some special values, such as Infinity, NAN, Zero. This selection is done based on the result select signal provided by EAD.

From the EAD to the result MUX, one of four different values are given within the result select signal. If the signal is overflow, underflow, or special value, the e2 signal is not to be used. If neither of these conditions apply, the result generator uses the e2 value and combines with the normalized output of the normalizer/rounder to create a final floating point sum generated as a standardized floating point value as a function of the result signal, the EAD e2 value, and the normalizer/rounder.

There are different kinds of rounding that can be performed by the rounder. In a fully IEEE compliant FPU, the design supports four rounding modes. The four rounding modes are a rounding up or down to the closest representable value mode, always rounding towards zero (for both positive and negative numbers), always rounding towards plus infinity (that is, to the higher value for both positive and negative values), and always rounding down towards the negative infinity (that is, to the smaller value for both positive and negative values). During the rounding step, the rounder and EAD together check for exception conditions, such as Overflow, Underflow and Inexact result indicia. Illegal operation exception and divide by zero get detected very early in the pipeline. In other words, there are two more IEEE exceptions, but they are not detected by the rounder and EAD; they can be detected based on the inputs within the first couple of cycles.) In case of denormal results (which have a 0 in front of the binary point and come only with the smallest possible exponent), modifications of the normalization and rounding are required. Depending on the design, this is either done on the fly while passing the data through LZA, normalizer and rounder, or extra cycles are added in order to adjust the result.

The FPU is either in IEEE mode, which means the result is fully IEEE compliant, or the FPU only supports parts of the IEEE standard in order to improve the performance of the FPU. In order to improve the performance of the floating-point operations, some design only supports part of the IEEE standard, that is, the design only implements one rounding mode and denormal results are forced to zero. High-performance real-time graphics applications are tuned to use the simplest of the IEEE rounding modes: round towards zero, also known as truncation. Such a fast FPU mode with truncation rounding is very appealing because the fraction rounding is reduced to truncating the fraction, whereas the other three IEEE rounding modes require an incrementer in the rounder which increments the fraction. Thus, a fast mode with truncation speeds up the rounding step.

However, there is a problem with prior art fast mode calculations which comprise truncation rounding. There can be significant processing time in calculating the exponents "e2" based on exponent "e" and the output LZA value, performing an LZA correction to determine the final value of "e2," and checking for overflow and underflow conditions. When supporting all four IEEE rounding modes, the time to run the EAD e2 calculations as a function of the LZA, and correcting the lza_corr and the overflow/underflow check, may not be an issue, as the normalizer and rounder takes time to perform its intensive calculation. However, in fast mode, there is no rounder used on the fraction path just the normalizer. Under this condition, the processing time of the EAD can be a bottleneck.

Therefore, there is a need for an FPU system designed for operation in fast mode that addresses at least some of the disadvantages associated with conventional FPU systems designed to operate in fast mode.

SUMMARY OF THE INVENTION

The present invention provides for a floating point unit (FPU) which generates a correction signal and an inverted leading zero signal. Exponent logic is configured to generate an exponent value, a first incremented exponent value, and a second incremented exponent value. Exponent adjust and rounding logic is configured to receive the exponent value, the first incremented exponent value, and the second incremented exponent value. The exponent adjust and rounding logic is further configured to add the inverted leading zero signal to the first incremented exponent value and the second incremented exponent value, thereby producing an exponent output value, a first incremented exponent output value, and a second incremented exponent output value.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
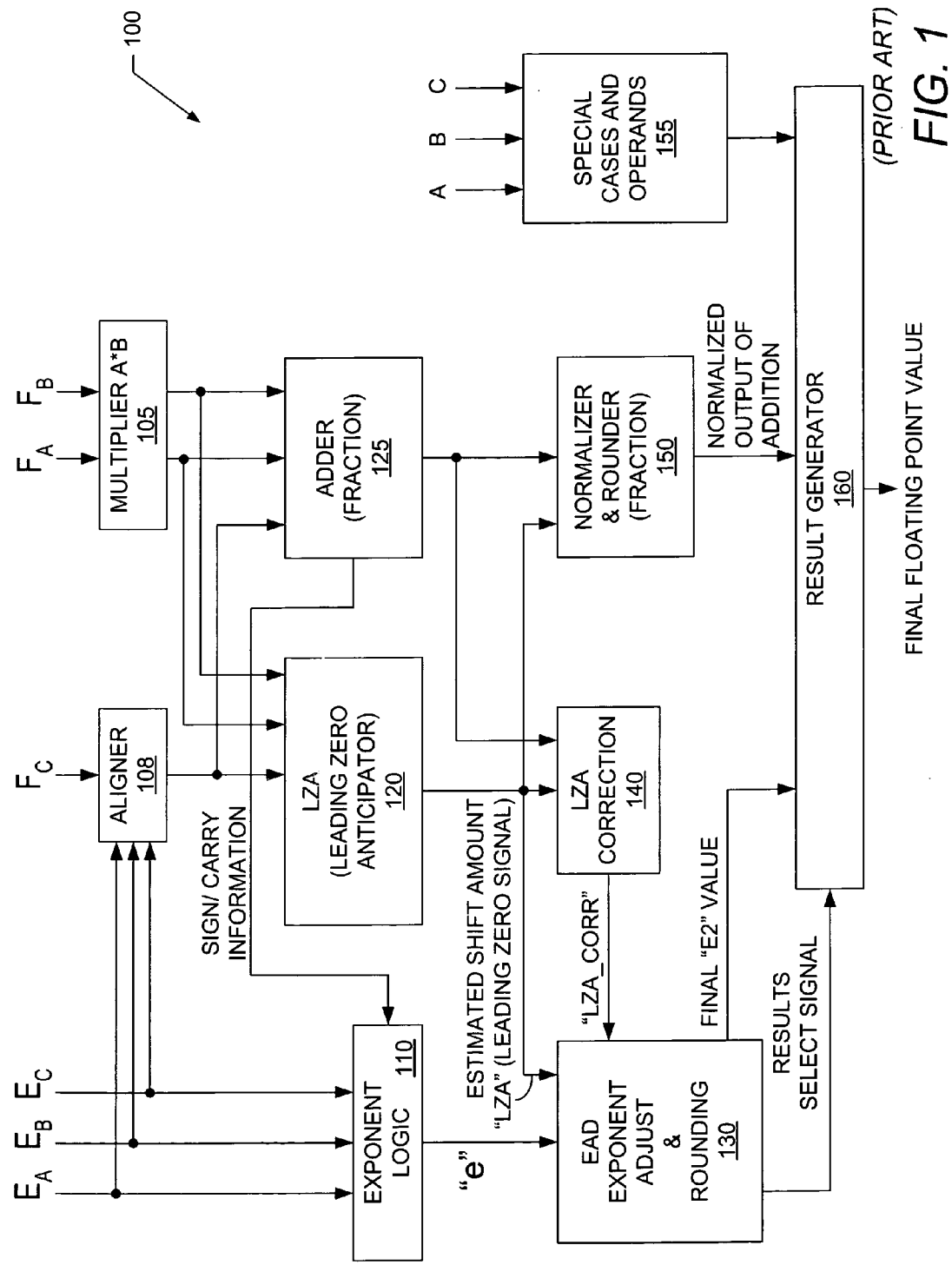
FIG. 1 schematically depicts a prior art FPU system.

Turning to FIG. 1, disclosed is a prior art FPU system 100 implementing a fused multiply-add A*B+C. A multiplier 105 receives the fractions of the values A and B, which are Fa and Fb, and computes the product Fa*Fb. An aligner 108 receives the fraction Fc of value C and the exponents of A, B and C, which are Ea, Eb, and Ec; the aligner aligns the fraction Fc relative to the fraction of the product. The outputs of the multiplier and aligner are provided to the adder 125 and the LZA 120. An exponent logic 110 receives the exponent values Ea, Eb, and Ec. Within the exponent logic there is generated an exponent value "e". Depending on the exponent difference of addend and product and the sign/carry information from the fraction adder, this exponent either is the exponent of the addend (Ec), the exponent of the product minus bias(Ea+Eb−bias), or the exponent of the product plus an offset (Ea+Eb+delta).

The exponent value "e" is sent to an EAD 130. Within the EAD, there is received an "estimated shift amount LZA" from a leading zero anticipator 120. Within the EAD 130, both values e2a=exponent−LZA and e2b=exponent−LZA+1 are computed.

Meanwhile, an LZA corrector 140 has also received the estimated shift amount LZA value from the LZA 120 and the output of the fraction adder 125. The LZA correction 140 detects whether the number of leading zeros computed by LZA is correct or off by one, and then inputs this as an lza_corr signal to the EAD 130. Based upon the lza_corr value, the EAD 130 selects the final e2 value, which is sent to a result generator 160. The EAD 130 also generates a result select signal which is input into the result generator 160. The result signal indicates whether the result generator 160 should output as a final floating point value from a rounder 150, which is a combination of the e2 value and the normalized and rounded output of the normalizer/rounder 150. Alternatively, the results select signal can indicate an underflow, an overflow, or output from special cases and operands logic 155. In any event, the result is output as the final floating point value from the result generator 160.

Figure 2:
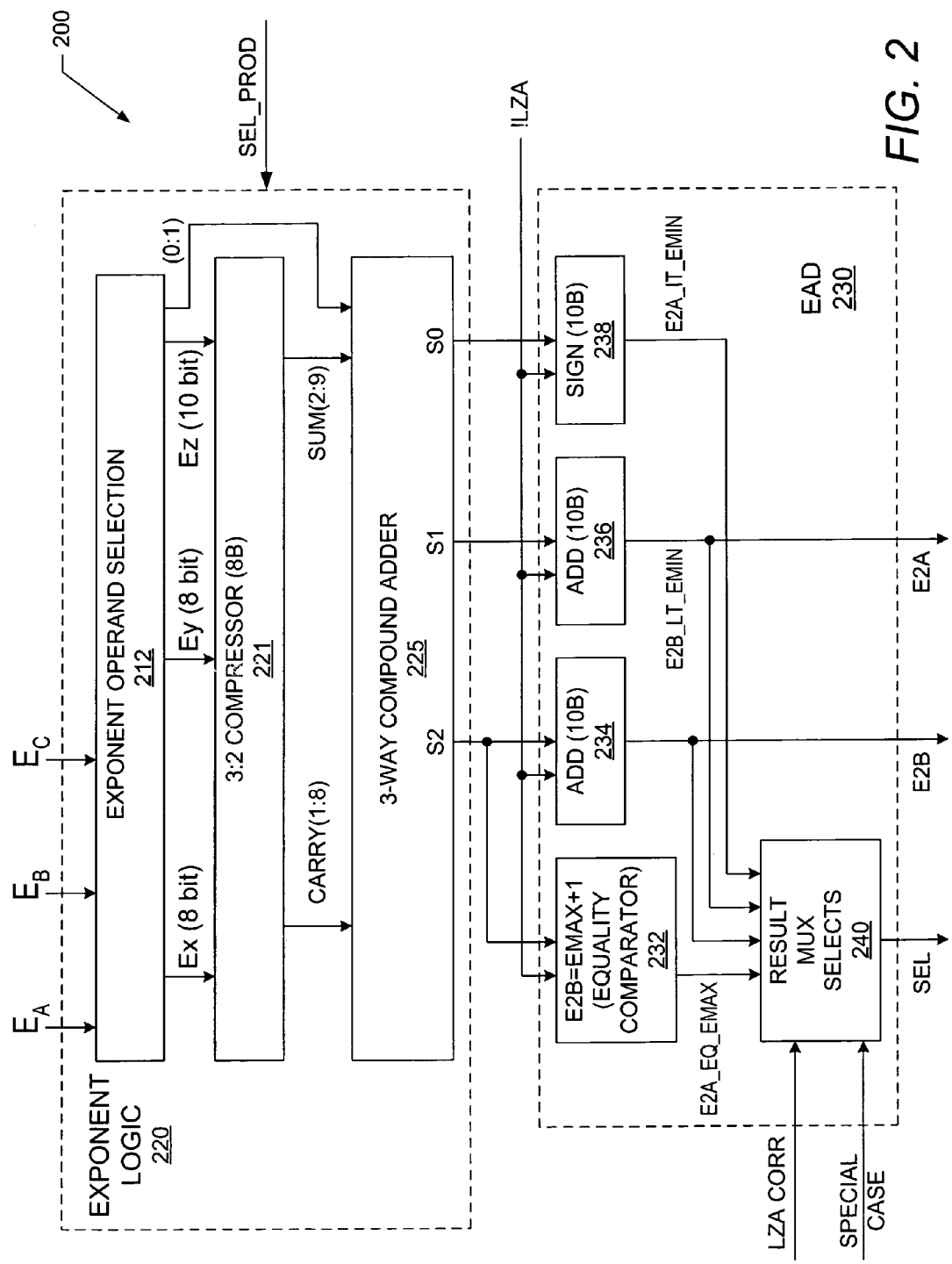
FIG. 2 illustrates an FPU with exponent logic and an EAD with a plurality of exponent values configured to be input into the EAD.

Turning now to FIG. 2, illustrated is an FPU exponent system 200. More particularly, illustrated is an exponent logic 220 coupled to an EAD 230. Generally, the system 200 calculates the alternative exponents within the exponent logic 220 and instead generates three exponent values for use by the EAD 230, not one (the value "e", as is illustrated in FIG. 1). The three values are a result of a 3:2 addition (corresponding to the value "e" from FIG. 1), plus one value higher and two values higher.

In FIG. 2, the exponent logic 220 receives the Ea, Eb, Ec, and some sign/carry information from the fraction adder into an exponent operand selection 212. The Exponent logic 220 uses these values to generate Ex, Ey, and Ez values which is done in the same way as in a conventional design. The Ex, Ey and Ez values are input into a 3:2 compressor 221. Ez is a 10-bit string, but the 3:2 compressor 221 is only eight bits wide. Thus, the two most significant bits of Ez, i.e. Ez[0:1], bypass the 3:2 compressor 221 and are fed directly into a 3-way compound adder 108 as sum(0:1). In the following and the preceding, the most significant bit is bit 0.

The 3:2 compressor 221 generates the sum (2:9) and the carry values (1:8). Generally, the processing that has gone before this stage in FIG. 2 is similar as in FIG. 1. However, in the FPU system 200, three values are generated from the addition of the sum and the carry. These three values are sent to the EAD 230. The three values are S0, (the addition, equivalent to the value "e" of FIG. 1), s1 (the addition plus one, "e+1"), and s2 (the addition 'e plus two' "e+2"). Using a 3-way compound adder 225, the three sums (sum, sum+1 and sum+2) can be generated without additional delay.

Turning back to FIG. 1, the exponent logic 110 would generate "e" and then the EAD 130 generates e−lza and e+1−lza or it generates "e" and e+1, selects e' between them and then computes e2=e'−lza, and a selection between these values would be made by the EAD 130 as a function of the lza_corr value received from the LZA correction logic 140. Turning back to FIG. 2, e, e+1 and e+2 are generated within the exponent logic 220. Furthermore, their use differs from the use of "e" of FIG. 1.

In the FPU system 200, "not lza" (!lza) is used. Using !lza is one way to perform subtraction within a logic circuit. For instance, a−b=a+!b+1. Instead of computing e=ea+eb−bias and e2=e+!lza+1 within the EAD 130, S1=ea+eb−bias+1 is computed within the exponent logic 220 and EAD then computes E2=S1+!lza. This saves the carry-in input in the adder, further reducing the delay of the EAD circuit. The computation of "e" and e+1 as well as the increment (+1) which is needed for the subtraction of lza are performed by the compound adder 225 in the exponent logic 220. Thus, this computation is moved to a prior clock cycle as compared to a conventional FPU, speeding up the subtraction in EAD 230.

Within the EAD 230, two values e2a and e2b are generated for the exponent e2=e−lz, where lz is the exact number of leading zeros. Due to the nature of logical arithmetic, e−lza =e2a, which equals e+!lza+1=S1+!lza as performed within the adder 236. E2b=e−lza+1=e+!lza+2=S2+!lza, as performed within an adder 234. Therefore, S1=e+1; S2=e+2. Thus, the outputs S1 and S2 of the exponent logic are added to the lza value within the add (10b) 234, 236 of EAD 230 to generate e2a and e2b. The two most significant bits of both values are sent to a result MUX selects circuit 240, and both of these values are sent to a result generator (not shown) and selected by a result generator as a function of the selects output of the result MUX selects generator 240.

In FIG. 1, in order to check for exception conditions, the final e2 was calculated within the EAD 130. The EAD 130 performs the overflow and underflow checking after that. System 200 avoids this latency by performing the exception checking substantially in parallel with the calculations of e2a and e2b; both calculations are performed by EAD 230. In the system 200, the LZA might overestimate the number of leading zeros by one. (In other designs the LZA might underestimate the number. With a slight modification, our invention also works for that case).

Turning back to FIG. 1, the exponents, the ea, eb, ec values, are input into the exponent logic 110 are in 8-bit biased format, as referenced in the IEEE Standard for Binary Floating-Point Arithmetic. The intermediate results in the exponent calculation exceed the range of 8-bit biased binary values. There are several different formats for the 10-bit intermediate results. These are intermediate results are the exponent "e" of FIG. 1 as well as e+1, e−lza. For FIG. 2, the intermediate results are the vectors CARRY, SUM, S0, S1, and S2. One most common format being 10-bit biased binary values, that is, the numbers have 10 bit representations and the bias is 511 instead of 127.

Turning again to FIG. 2, the system 200 uses a different representation for the intermediate exponent results S0, S1, S2. The intermediate numbers S0, S1, and S2 are represented as 10-bit two's complement numbers with a bias of 127. This helps with the underflow detection. e=00000001 corresponds to the value 1−127=−126. An underflow occurs when the exponent becomes smaller than −126. In one embodiment, overflow and underflow detection are performed as follows.

Specifically, due to the logical arithmetic nature of underflow detection, e2a is less than emin if, and only if, the value of e2a is less than the value of −126. In an embodiment of a 10-bit two's complement numbers with a bias of 127, this is the case if and only if the (unbiased) two's complement value of e2a is less than 1. In other words, if the two's complement value of exponent e2a is zero or negative or, alternatively, if e2a−1 is negative, there is an underflow.

Within the underflow, both e2a and e2b checking is performed. This is performed within the EAD 230. For the underflow detection of e2a, it is checked whether e2a−1<0. S0 is added to lza within an adder 238 to perform this test (e2a−1 =S1+!lza−1=S0+!lza). If the sign of e2a−1 is 1, then there is an underflow for e2a. For any value greater than or equal to 0, the sign will equal zero. The sign bit of the addition S0+!lza indicates that e2a is less than emin. In the system 200, this signal is displayed as e2a_lt_emin.

In order to detect that e2b causes an underflow, it is checked whether e2b−1=e2a is less than 0. This can be detected by inspecting the sign bit of the e2a result. An underflow occurs for e2b if the sign bit e2a(0)=e2b_lt_emin is 1. Both of these results (e2a_lt_emin, e2b_lt_emin) are also input into a result mux selects logic 240. One advantage of this approach is that the underflow condition can be determined before receiving the lza_corr value within the result mux selects 240, which can save significant time. An advantage of using the 10-bit two's complement representation with bias 127 in the adder 238 is that the underflow can be detected by checking the sign bit.

Within an overflow selector, there is a testing of an overflow condition. This is performed as follows. Exponent e2a causes an overflow, if it is larger than the maximal exponent emax. Emax is the constant value 127. In the number representation used within FIG. 2 (10-bit two's complement with bias 127), Emax has the representation "00.1111.1110". Thus, exponent e2a causes an overflow if and only if e2a+1>00.1111.1111. This is true if and only if e2b =e2a+1 is greater or equal to 01.0000.0000. Due to the two's complement representation, the overflow of e2a can be checked by inspection of the two most significant bits of eb2 for the pattern "01". Thus, e2a_gt_emax=!e2b(0) and e2b(1). This computation is performed in the result mux select logic 240.

S2+!lza is performed in the adder 234. Exponent e2b=s2+ !lza (as has already been outputted in the e2b output line) causes an overflow if it is larger than emax. Given the chosen number format, e2b causes an overflow if and only if e2b is greater or equal to 00.1111.1111. This can be checked by testing whether e2b>00.1111.1111 or e2b=00.1111.1111. The first part of the test (check for greater than) is identical to the overflow check of e2a. For the second part of the test, in order for the comparison e2b=00.1111.1111 to take place, however, it is not necessary for there to be a full calculation of e2b. Instead, the s2 value and the !lza values are compared.

For single precision, the adder result is less than 100 bits wide. Therefore, the number of leading zeros is less than 127 and hence, !lza has at least two leading ones. For the check e2b=00.1111.1111, is then determined whether !lza(0:9)+S2 (0:9)=100.1111.1111 or 00.1111.1111. The least significant eight bits of e2b are all One, if and only if S2(2:9) equals lza(2:9). When adding these bits together, they do not generate a carry out. Given that !lza(0:1)=11, and that the sum of the less significant bits is not generating a carry, !lza(0:1)+S2(0:1) equals 100 if and only if S2(0:1)=01. Thus, comparator 232 detects that e2b=00.1111.1111 by checking that S2(0:1)=01 and that S2(2:9) equals lza(2:9). This is indicated by a signal e2a_eq_emax.

Finally, the e2b(0:1) value, the e2a(0)=e2b_lt_emin value, the e2a_eq_emax value and the e2a_lt_emin value are all input into the result mux selects logic 240. In the system 200, the result mux selects logic 240 has five different output logic states. These are 10000 for number 0, 01000 for number 1, 00100 for number 2 and so on. The five outputs of the selector are as follows: if sel(0) is One, then a special/override value is generated, as input by the special case line and the result mux selects a special result. If sel(1) is One, then an overflow value is indicated and the result mux selects Infinity. If sel(2) is One, an underflow value is indicated and the result mux selects Zero. If sel (3) is 1ne, then the result mux selects e2a and the values 1:23 of the output of the normalizer. If sel (4) is One, then the result mux selects e2b and the values 0:22 of the output of the normalizer.

TABLE 1

Logic of result mux generator 240.

| spec | E2a-gt-emax | E2a-eq-emax | E2b-lt-emin | E2a-lt-emin | Lza-corr | Sel (0:4) | Overflow/ underflow Exception | Result exponent |
|---|---|---|---|---|---|---|---|---|
| 1 | | | | | | 10000 | Special | Special |
| 0 | 1 | | | | | 01000 | Overflow | 127 |
| 0 | | 1 | | | 1 | 01000 | Overflow | 127 |
| 0 | | | 1 | | | 00100 | Underflow | 0 |
| 0 | | | | 1 | 0 | 00100 | Underflow | 0 |
| 0 | 0 | 0 | 0 | 0 | 0 | 00010 | None | E2a |
| 0 | 0 | 0 | 0 | 0 | 1 | 00001 | None | E2b |

The logic within the result mux selects generator 240 generates the select signals sel(0:4) and the exception flags Overflow and Underflow according to the truth-table of Table 1. In Table 1, a blank entry indicates that the value is a "don't-care" in that particular case. Note that the pair of signals e2a_gt_emax/e2a_eg_emax and the pair e2b_lt_emin/e2a_lt_emin cannot be true (1) at the same time.

If select spec is "on", then sel (0) is on, and no further checking occurs. If signal spec is Zero, the result mux selects logic 240 checks for an overflow or underflow condition. Overflow occurs if e2a_gt_emax is on or if e2a_eq_emax and lza_corr is on. Underflow occurs if e2b_lt_emin is on or if e2a_lt_emin is on and lza_corr is off.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built. The present invention is described for single precision numbers, but can easily be applied to other formats as well. The present invention is described for a fused multiply add FPU, but can also be applied to the add part of a split FPU design as well, for example.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A floating point unit (FPU), comprising:
   an exponent logic (EL), comprising:
   an exponent operand selection logic configured to receive a first exponent signal Ea, a second exponent signal Eb, and a third exponent signal Ec, and to generate first intermediate signal Ex, second intermediate signal Ey, and third intermediate signal Ez based on signals Ea, Eb, and Ec;

a 3:2 compressor configured to receive the signals Ex, Ey, and Ez, and to generate a carry signal and a sum signal based on the signals Ex, Ey, and Ez; and a 3-way compound adder configured to receive the carry signal, the sum signal, and the signal Ez, and to generate a first EL output signal S0, a second EL output signal S1, and a third EL output signal S2 based on the received carry signal, sum signal and signal Ez;

wherein the signal S0 represents an exponent value "e", the signal S1 represent the exponent value "e+1", and the signal S2 represents the exponent value "e+2";

an exponent adjust and rounding logic (EAD) coupled to the EL and to a result generator, the EAD configured to receive the signals S0, S1, and S2, an inverted anticipated leading zero shift signal (!LZA), a corrected leading zero shift signal (LZA_CORR), and a special case signal, the EAD configured to:

generate a first output signal E2A based on the received S1 and !LZA signals;

generate a second output signal E2B based on the received S2 and !LZA signals;

generate a results select signal based on the received signals S0, S1, S2, !LZA, LZA_CORR and the special case signal; and transmit the results select signal, and the signals E2A and E2B to the result generator.

2. The FPU of claim 1, wherein the EAD further comprises a first adder configured to receive the signals S1 and !LZA and to generate the first output signal E2A based on the received signals S1 and !LZA.

3. The FPU of claim 1, wherein the EAD further comprises a second adder configured to receive the signals S2 and !LZA and to generate the first output signal E2B based on the received signals S2 and !LZA.

4. The FPU of claim 1, wherein the EAD further comprises a result multiplexer configured to generate the results select signal based on the received signals S0, S1, S2, !LZA, LZA_CORR and the special case signal.

5. The FPU of claim 1, wherein the EAD is further configured to determine whether an underflow condition exists based on the signals S0 and !LZA.

6. The FPU of claim 1, wherein the EAD is further configured to determine whether an underflow condition exists based on the signals S1 and !LZA.

7. The FPU of claim 1, wherein the EAD further is further configured to determine whether an overflow condition exists based on a first most significant bit (MSB) and a second MSB of the signal E2B.

8. The FPU of claim 1, wherein the signals Ex and Ey represent 8-bit numbers and the signal Ez represents a 10-bit number.

9. The FPU of claim 8, wherein the a first most significant bit (MSB) and a second MSB of the signal Ez are input to the 3-way compound adder and bypass the 3:2 compressor.

10. The FPU of claim 1, wherein the EAD is further configured to check for exceptions substantially in parallel generation of the signals E2A and E2B.

11. The FPU of claim 1, wherein the signals S0, S1, S2 represent 10-bit 2's complement numbers, with a bias of 127.

12. The FPU of claim 1, wherein the FPU is configured to perform fast mode rounding.

13. The FPU of claim 12, wherein the FPU is further configured to perform fractional truncation.

* * * * *